(12) United States Patent
Chen

(10) Patent No.: US 9,048,883 B2
(45) Date of Patent: Jun. 2, 2015

(54) ELECTRONIC SYSTEM HAVING SHARED ANTENNA STRUCTURE FOR RECEIVING SIGNALS CORRESPONDING TO VARIOUS FREQUENCY BANDS

(71) Applicants: IEI Integration Corp., New Taipei (TW); Armorlink SH Corp., Shang-Hai (CN)

(72) Inventor: Li-Ying Chen, New Taipei (TW)

(73) Assignees: IEI Integration Corp., Xizhi Dist., New Taipei (TW); Armorlink SH Corp., Min-Sing-Sin-Jhuang Industrial District, Shang-Hai (CN)

( * ) Notice: Subject to any disclaimer, the term of this patent is extended or adjusted under 35 U.S.C. 154(b) by 42 days.

(21) Appl. No.: 14/141,462

(22) Filed: Dec. 27, 2013

(65) Prior Publication Data

US 2015/0126120 A1    May 7, 2015

(30) Foreign Application Priority Data

Nov. 5, 2013  (CN) ...................... 2013 2 0694522 U

(51) Int. Cl.
| H04B 7/00 | (2006.01) |
| H04B 1/00 | (2006.01) |
| H04W 4/00 | (2009.01) |
| G06Q 10/08 | (2012.01) |

(52) U.S. Cl.
CPC ............. *H04B 1/0057* (2013.01); *H04W 4/008* (2013.01); *G06Q 10/087* (2013.01)

(58) Field of Classification Search
CPC ... H04B 1/0057; H04B 4/008; G06Q 10/0087
USPC ........... 455/41.2, 41.1, 78, 550.1, 101, 575.7, 455/289
See application file for complete search history.

(56) References Cited

U.S. PATENT DOCUMENTS

| 7,835,707 | B2* | 11/2010 | Yoon ............................... 455/78 |
| 7,881,665 | B2* | 2/2011 | Symons ...................... 455/41.1 |
| 7,907,926 | B2* | 3/2011 | Rofougaran ................... 455/289 |
| 8,219,157 | B2* | 7/2012 | Lum et al. ....................... 455/73 |
| 8,483,749 | B2* | 7/2013 | Jang et al. .................. 455/550.1 |
| 2006/0141944 | A1* | 6/2006 | Shibagaki et al. .............. 455/78 |
| 2010/0279734 | A1* | 11/2010 | Karkinen et al. .......... 455/554.2 |

\* cited by examiner

*Primary Examiner* — Marceau Milord
(74) *Attorney, Agent, or Firm* — Winston Hsu; Scott Margo

(57) ABSTRACT

An electronic system includes a shared antenna, a diplexer and a processing circuit. The shared antenna corresponds to a first frequency band and a second frequency band, wherein the first frequency band meets a wireless radio frequency identification (RFID) standard, and the second frequency band meets a near field communication (NFC) standard. The diplexer receives a wireless signal from the shared antenna, and divides the signal into a WIRELESS RFID signal component corresponding to the first band and an NFC signal component corresponding to the second band. The processing circuit is coupled to the diplexer, and arranged to process the WIRELESS RFID signal component and the NFC signal component.

11 Claims, 2 Drawing Sheets

ELECTRONIC SYSTEM HAVING SHARED ANTENNA STRUCTURE FOR RECEIVING SIGNALS CORRESPONDING TO VARIOUS FREQUENCY BANDS

BACKGROUND OF THE INVENTION

1. Field of the Invention

The present invention relates to an electronic system, and more particularly, to a shared antenna structure for receiving signals corresponding to two distinct frequency bands.

2. Description of the Prior Art

The ultra-high frequency RFID (UHF RFID) wireless communication technique is widely applied to handheld devices and various electronic devices. In general, an ultra-high frequency signal refers to an electromagnetic wave having a frequency of 300 MHz-3 GHz and a wavelength of 10 cm to 1 m, wherein the wireless fidelity (WIFI) and Bluetooth (BT) communication transmissions are common applications. The transmission distance of the BT technique is shorter, but the BT technique is more convenient to be paired with electronic devices under an environment which lacks a wireless network.

The RFID technique is also applied to warehouse management systems, to detect bar codes on merchandise, and thereby manage and check the merchandise. There is a disadvantage, however, that an RFID sensor is usually configured at a fixed location, and therefore the merchandise will be detected only when it is placed on a conveyer belt. Further, under an environment which lacks a wireless network, there is no linking between electronic devices, and therefore the data scanned by the RFID sensor cannot be obtained in real-time.

The NFC technique is a short distance high frequency wireless communication technique that allows electronic equipment to interchange data within 10 cm through non-contacting point-to-point data transmission. The operation of the NFC technique is similar to that of the Taipei metro system easy card and the electronic toll collection (ETC) highway charge system, wherein data transmission can be performed between devices without requiring direct contact. At present, most smart phones are designed to include the NFC communication function, and can be used to interchange data between electronic equipment. Similar to the easy card, a user may thereby trade or pay bills with a smart phone.

SUMMARY OF THE INVENTION

An embodiment of the present invention provides an electronic system. The electronic system includes a shared antenna, a diplexer and a processing unit. The shared antenna corresponds to a first frequency band and a second frequency band, wherein the first frequency band meets a wireless radio frequency identification (RFID) standard, and the second frequency band meets a near field communication (NFC) standard. The diplexer is coupled to the shared antenna, and includes an input end, a first output end and a second output end, wherein the input end of the diplexer is used to receive a receiving signal from the shared antenna, the diplexer transmits a wireless RFID signal component of the receiving signal corresponding to the first band to the first output end of the diplexer, and transmits an NFC signal component of the receiving signal corresponding to the second band to the second output end. The processing circuit is coupled to the diplexer, and arranged to process the wireless RFID signal component when receiving the wireless RFID signal component, and process the NFC signal component when receiving the NFC signal component.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ." Also, the term "couple" is intended to mean either an indirect or direct electrical connection. Accordingly, if one device is coupled to another device, that connection may be through a direct electrical connection, or through an indirect electrical connection via other devices and connections.

Figure 1:
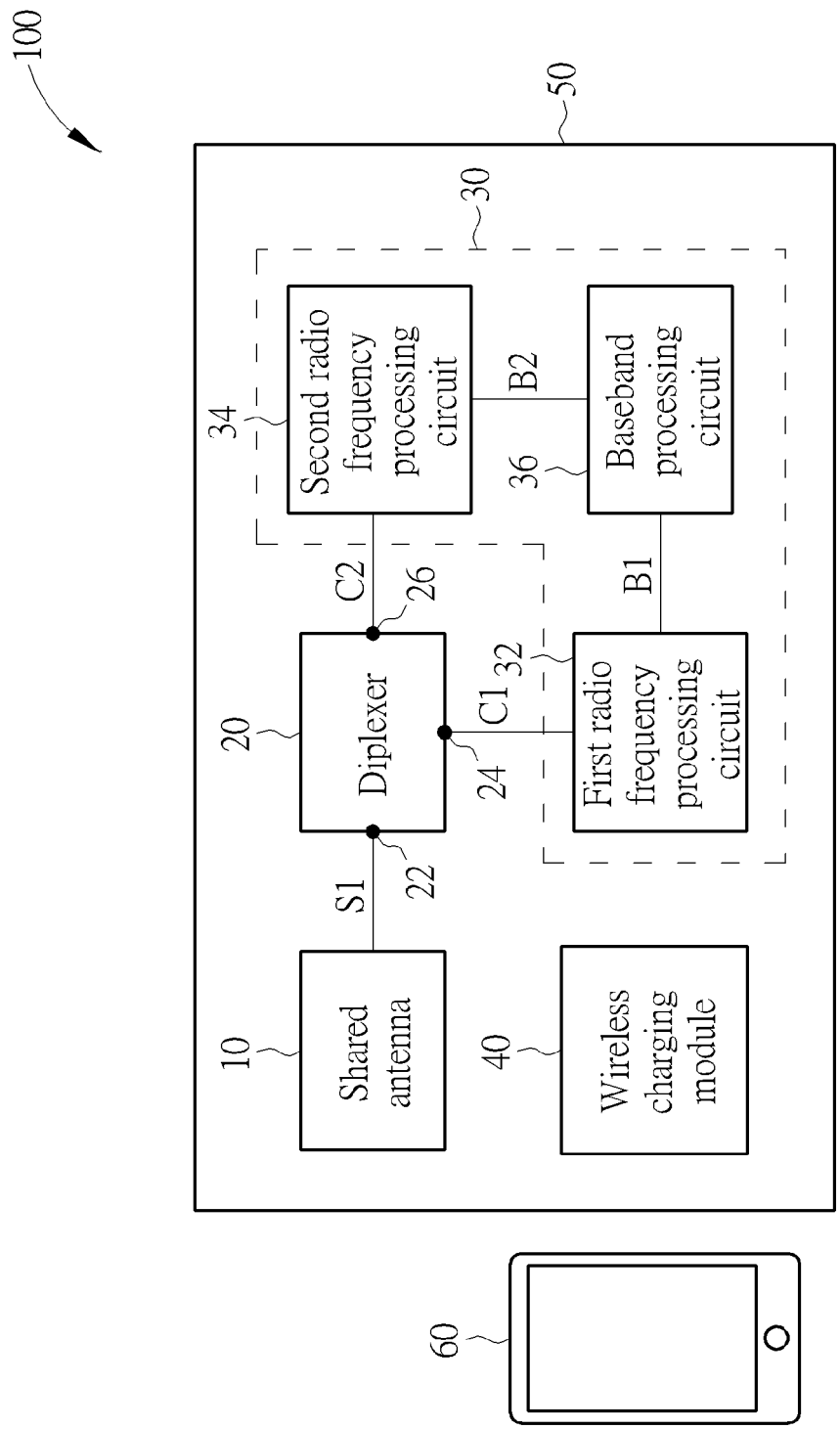
FIG. 1 is a diagram illustrating an electronic system according to a first embodiment of the present invention.

Please refer to FIG. 1, which is a diagram illustrating an electronic system 100 according to a first embodiment of the present invention. As shown in FIG. 1, the electronic system 100 includes a shared antenna 10, a diplexer 20 and a processing unit 30. The shared antenna 10 corresponds to a first frequency band and a second frequency band. In this embodiment, the shared antenna 10 simultaneously corresponds to a plurality of frequency bands. For example, the first frequency band meets a wireless radio frequency identification (RFID) standard, and the second frequency band meets a near field communication (NFC) standard. The diplexer 20 is coupled to the shared antenna 10, and includes an input end 22, a first output end 24 and a second output end 26. The input end 22 is used to receive a signal S1 (such as an RF signal) from the shared antenna 10. The diplexer 20 transmits a wireless RFID signal component C1 of the receiving signal S1 corresponding to the first band to the first output end 24, and transmits an NFC signal component C2 of the receiving signal S1 corresponding to the second band to the second output end 26. The processing circuit 30 is coupled to the diplexer 20, and arranged to process the wireless RFID signal component C1 when receiving the wireless RFID signal component C1, and process the NFC signal component C2 when receiving the NFC signal component C2. In other words, the processing circuit 30 includes both the function of processing RFID signals and of processing NFC signals.

The processing circuit 30 includes a first radio frequency processing circuit 32, a second radio frequency processing circuit 34 and a baseband processing circuit 36. The first radio frequency processing circuit 32 is coupled to the first output end 24 of the diplexer 20, and arranged for processing the wireless RFID signal component C1 to generate a first baseband signal B1. For example, the first radio frequency processing circuit 32 may generate the first baseband signal B1 through performing frequency reduction and filtering on the wireless RFID signal component C1. The second radio frequency processing circuit 34 is coupled to the second output end 26 of the diplexer 20, and arranged for processing the NFC signal component C2 to generate a second baseband signal B2. For example, the second radio frequency processing circuit 34 may generate the second baseband signal B2 through performing frequency reduction and filtering on the NFC signal component C2. The baseband processing circuit 36 is coupled to the first radio frequency processing circuit 32 and the second radio frequency processing circuit 34, and arranged for processing the first baseband signal B1 and the second baseband signal B2. The frequency of the wireless RFID signal component C1 is higher than the frequency of the NFC signal component C2 (e.g. the frequency band of the RFID signal may be 900 MHz, and the frequency band of the NFC signal may be 13.56 MHz). Hence, the first radio frequency processing circuit 32 is used to process the radio frequency input having higher frequency, and the second radio frequency processing circuit 34 is used to process the radio frequency input having lower frequency.

Through the hardware configuration of the first embodiment, the shared antenna 10 may simultaneously receive RFID signals and NFC signals. Hence, the electronic system 100 does not need two antenna systems corresponding to different frequency bands in order to receive signals from two distinct frequency bands. Further, the electronic system 100 can be applied to a warehouse management system. For example, the shared antenna 10 may receive an RFID signal from an electronic tag on merchandise, and the handheld communication device 60 (such as a smart phone) can be used to identify the bar code on the merchandise. For example, a tag scanning function of the handheld device 60 can be used to scan tags, and then information of the tags can be transmitted to the shared antenna 10 through near field communication. The handheld device 60 is required to have both NFC function and the bar code scanning function in order to transmit information of bar codes to the shared antenna 10 through near field communication after scanning the bar codes. Next, the diplexer 20 will transmit an NFC signal including the NFC signal component C2 to the second radio frequency processing circuit 34.

Compared with prior art detecting methods, the present invention not only verifies electronic tags, but also compares the electronic tags with the obtained bar code information to verify the goods once more. Further, the method provided in this embodiment can be implemented by a standard cell phone, and does not require additional equipment. Moreover, the shared antenna structure effectively reduces the volume and cost of the electronic system, and the first radio frequency processing circuit 32 and the second radio frequency processing circuit 34 may be integrated as a single circuit (e.g. a single chip) to further reduce the volume and cost of the processing circuit 30.

The electronic system 100 may be configured to further include a wireless charging module 40 for charging the handheld communication device 60. The wireless charging module 40 can be a wireless charging pad for charging a handheld communication device having charging coils. Further, the shared antenna 10, the diplexer 20, the first radio frequency processing circuit 32, the second radio frequency processing circuit 34 and the baseband processing circuit 36 may be configured on a docking station 50. The present invention can thereby be applied to the platform of a warehouse management system. Moreover, when the wireless charging module 40 is configured in the docking station 50, it can wirelessly or in a wired manner charge the handheld communication device 60. Please note that using a docking station to implement the electronic system 100 is merely illustrated as an example, rather than a limitation of the present invention.

Figure 2:
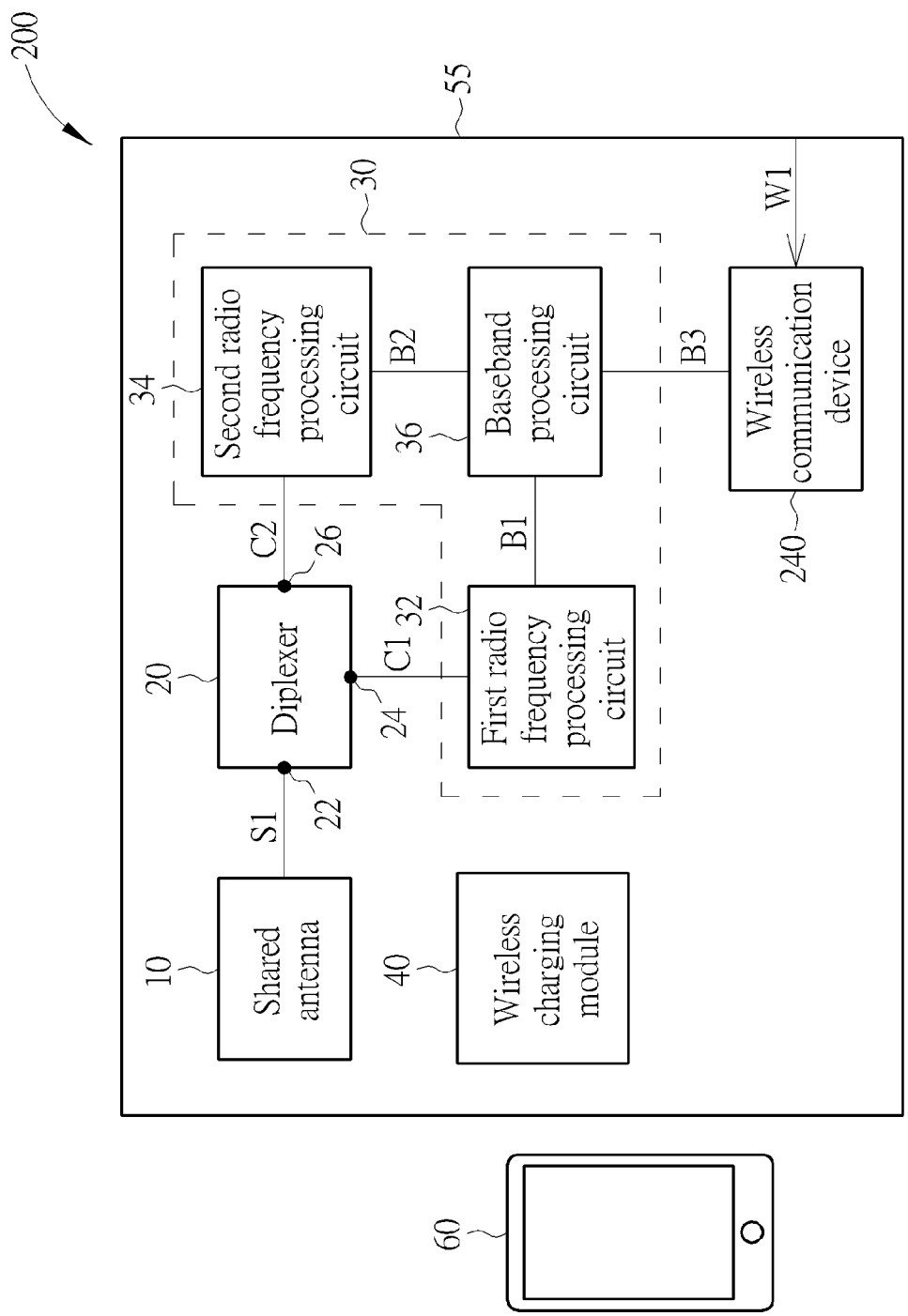
FIG. 2 is a diagram illustrating an electronic system according to a second embodiment of the present invention.

Please refer to FIG. 2, which is a diagram illustrating an electronic system according to a second embodiment of the present invention. As shown in FIG. 2, the difference between the electronic system 200 and the electronic system 100 is that the electronic system 200 further includes a wireless communication device 240, and the baseband processing circuit 36 is further used to process a third baseband signal B3. When the electronic system 200 is applied to a warehouse management system, the shared antenna 10, the diplexer 20, the first radio frequency processing circuit 32, the second radio frequency processing circuit 34, the wireless communication device 240 and the baseband processing circuit 36 may be configured on a docking station 55. Further, the electronic system 200 may also be configured to include the wireless charging module 40, which means the wireless charging module 40 can be configured in the docking station 55 to wirelessly charge the handheld communication device 60.

The wireless communication device 240 is coupled to the baseband processing circuit 360 to receive a wireless communication signal W1 corresponding to a third frequency band, and output the third baseband signal B3 to the baseband processing circuit 36. In this embodiment, the third frequency band is different from the aforementioned first frequency band and the second frequency band. For example, the third frequency band may be a frequency band meeting the BT standard, and the wireless communication signal W1 may be a BT signal transmitted from the handheld communication device 60.

When the electronic system 200 is applied to a warehouse management system, the handheld communication device 60 may be used to identify the bar codes on various goods. The bar code information can be transmitted to the shared antenna through near field communication, or can be transmitted to the wireless communication device 240 of the electronic system 200 through BT communication. Compared with prior art detecting methods, this embodiment of the present invention not only verifies electronic tags, but also compares the electronic tags with the obtained bar code information to verify the goods once more. Further, the method provided in this embodiment can be implemented in a standard cell phone, and does not require additional equipment. Moreover, the shared antenna structure effectively reduces the volume and cost of electronic systems, and the first radio frequency processing circuit 32, the second radio frequency processing circuit 34 and the wireless communication device 240 may be integrated as a single circuit (e.g. a single chip) to further reduce the volume and cost of the processing circuit 30.

In the second embodiment, the handheld communication device 60 needs to include a bar code scanning function and a distant wireless transmission function (such as Bluetooth), so that the handheld communication device 60 can output the wireless communication signal corresponding to the third frequency band to transmit the bar code information to the wireless communication device 240. The electronic system 200 is adapted to an environment which lacks a WiFi internet, such as a warehouse environment. Through the electronic system 200, bar codes on various goods can be detected at a distance, and then compared with RFID signals received from the electronic tags on the goods via the shared antenna 10.

The present invention is not limited to the aforementioned embodiment; for example, the shared antenna may be designed to receive signals corresponding to more than two frequency bands. Further, the first, second and third frequency bands are also not limited to the illustrated three frequency bands.

In view of the above, the present invention provides a shared antenna structure for receiving signals corresponding to various frequency bands and an integrated processing circuit, thus improving the convenience of detecting operations without increasing the volume of the electronic system. Moreover, the present invention can be implemented with both Bluetooth and wireless charging functions to increase functionality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic system comprising:
a shared antenna, corresponding to a first frequency band and a second frequency band, wherein the first frequency band meets a wireless radio frequency identification (RFID) standard, and the second frequency band meets a near field communication (NFC) standard;
a diplexer, coupled to the shared antenna, and comprising an input end, a first output end and a second output end, wherein the input end of the diplexer is used to receive a receiving signal from the shared antenna, the diplexer transmits a wireless RFID signal component of the receiving signal corresponding to the first band to the first output end of the diplexer, and transmits an NFC signal component of the receiving signal corresponding to the second band to the second output end; and
a processing circuit, coupled to the diplexer, and arranged to process the wireless RFID signal component when receiving the wireless RFID signal component, and to process the NFC signal component when receiving the NFC signal component.

2. The electronic system of claim 1, wherein the processing circuit comprises:
a first radio frequency processing circuit, coupled to the first output end of the diplexer, arranged for processing the wireless RFID signal component to generate a first baseband signal;
a second radio frequency processing circuit, coupled to the second output end of the diplexer, arranged for processing the NFC signal component to generate a second baseband signal; and
a baseband processing circuit, coupled to the first radio frequency processing circuit and the second radio frequency processing circuit, and arranged for processing the first baseband signal and the second baseband signal.

3. The electronic system of claim 2, wherein the shared antenna, the diplexer, the first radio frequency processing circuit, the second radio frequency processing circuit and the baseband processing circuit are configured on a docking station.

4. The electronic system of claim 2, further comprising:
a wireless communication device, coupled to the baseband processing circuit, arranged to receive a wireless communication signal corresponding to a third frequency band, and output a third baseband signal to the baseband processing circuit;
wherein the third frequency band is different from the first frequency band and the second frequency band, and the baseband processing circuit is further used to process the third baseband signal.

5. The electronic system of claim 4, wherein the third frequency band meets a Bluetooth (BT) standard.

6. The electronic system of claim 4, further comprising:
a handheld communication device, having an NFC function, and arranged to receive sensing information through the NFC function and output the wireless communication signal corresponding to the third frequency band to transmit the sensing information to the wireless communication device.

7. The electronic system of claim 6, wherein the handheld communication device is a cell phone.

8. The electronic system of claim 6, further comprising:
a wireless charging module, arranged for charging the handheld communication device.

9. The electronic system of claim 4, further comprising:
a handheld communication device, having a bar code scanning function, arranged to receive bar code information and output the wireless communication signal corresponding to the third frequency band to transmit the bar code information to the wireless communication device.

10. The electronic system of claim 9, wherein the handheld communication device is a cell phone.

11. The electronic system of claim 9, further comprising:
a wireless charging module, arranged for charging the handheld communication device.

* * * * *